United States Patent [19] [11] 4,018,077
Leach [45] Apr. 19, 1977

[54] APPARATUS FOR PROVIDING A CONTROLLED CONCENTRATION OF A SUBSTANCE IN A FLOW OF LIQUID

[75] Inventor: Robert J. Leach, Luton, England

[73] Assignee: George Kent Limited, Luton, England

[22] Filed: Nov. 21, 1975

[21] Appl. No.: 634,282

[30] Foreign Application Priority Data
Nov. 22, 1974 United Kingdom ............ 50789/74

[52] U.S. Cl. .................................. 73/1 R; 73/1 G; 137/268; 261/38; 261/104

[51] Int. Cl.² ..................... G01N 27/00; B01F 1/00

[58] Field of Search .......... 73/1 R, 1 G; 423/638.5; 23/272.7, 272.8; 137/268; 261/20, 38, 104, 122, DIG. 7

[56] References Cited

UNITED STATES PATENTS

| | | | |
|---|---|---|---|
| 1,964,576 | 6/1934 | Horne | 23/272.7 |
| 3,165,114 | 1/1965 | Garrett | 23/272.7 |
| 3,218,841 | 11/1965 | Lerner | 73/1 R |
| 3,894,419 | 7/1975 | Mator et al. | 73/1 G |

FOREIGN PATENTS OR APPLICATIONS

| | | |
|---|---|---|
| 790,746 | 2/1958 | United Kingdom |
| 602,666 | 6/1948 | United Kingdom |
| 869,468 | 5/1961 | United Kingdom |
| 959,149 | 5/1964 | United Kingdom |

Primary Examiner—S. Clement Swisher
Attorney, Agent, or Firm—Browdy and Neimark

[57] ABSTRACT

Apparatus comprising a liquid flow path having two parallel connected sections, namely a first section adapted to provide turbulent flow and a second section adapted to provide laminar flow. Water flowing through the apparatus divides between the two sections in a ratio which is arranged to be independent of the total flow, the flow through the second section being saturated with oxygen. The apparatus thus provides a controlled concentration of oxygen. Temperature compensation is achieved by arranging for changes in the flow ratio caused by viscosity variations to compensate for variations in oxygen solubility.

16 Claims, 6 Drawing Figures

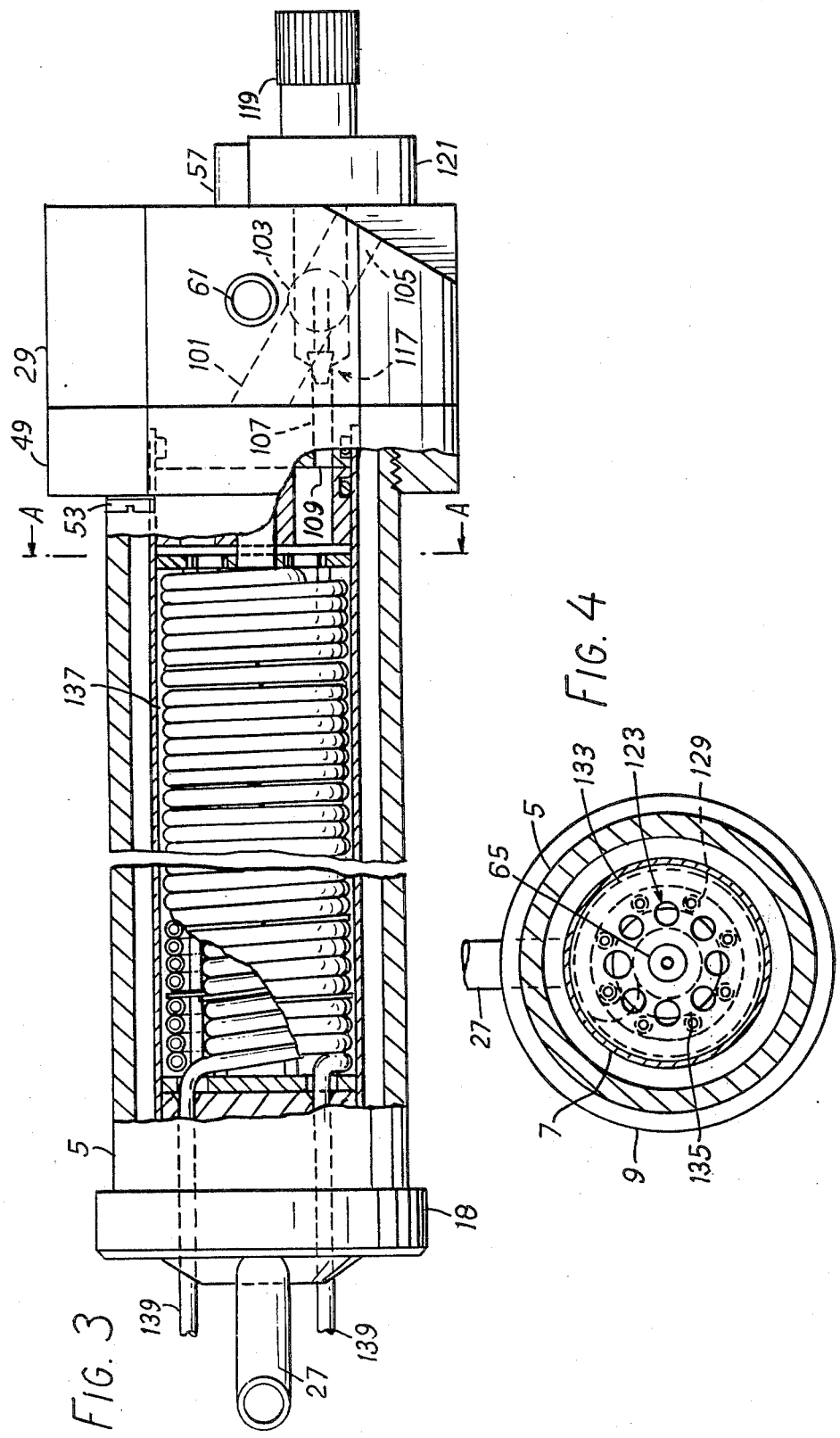

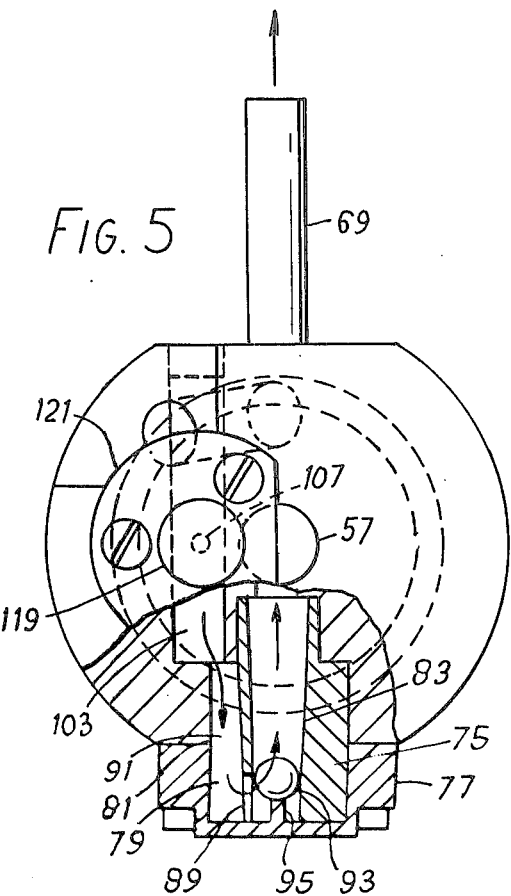
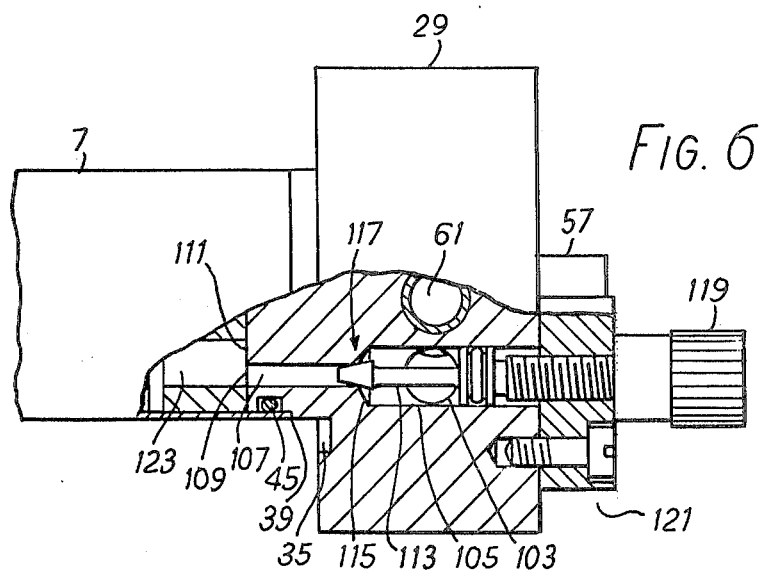

APPARATUS FOR PROVIDING A CONTROLLED CONCENTRATION OF A SUBSTANCE IN A FLOW OF LIQUID

BACKGROUND OF THE INVENTION

This invention relates to apparatus for and a method of providing a controlled concentration of a gas in a flow of liquid. A typical example of an application of such apparatus is in the calibration of monitors used for determining the concentration of gases dissolved in water. Apparatus according to the invention may be used to provide a known, controlled concentration of the gas, to afford a fixed point calibration of the monitor. An advantageous use of apparatus according to the invention lies in the provision of a controlled concentration of oxygen in a flow of water for use in the calibration of low level dissolved oxygen monitors. Previously, apparatus for this purpose has usually involved electrolysis techniques with electrodes being placed in the flow of water to produce oxygen by the electrolysis of small amounts of the water. An important disadvantage of present electrolysis methods is that the magnitude of the water flow through the cell must be known precisely before a calculation of the resulting oxygen concentration can be made.

A further disadvantage of certain electrolysis methods is that, due to the high voltages which are necessary in view of the low electrical conductivity of water, a variety of electrochemical reactions can take place of which the electrolysis of water is only one. Consequently there are uncertainties in the concentration of oxygen in the flow. It has been proposed that salts should be added to the water to increase its conductivity, but this is a difficult operation and small uncertainties in the oxygen concentration remain.

It is an object of this invention to provide an improved method and form of apparatus which does not suffer from the above disadvantages and which is simple both in construction of the apparatus and in operation. It will be understood, however, that the invention is applicable to gases other than oxygen and to flows of liquid other than water.

It is a further object of some embodiments of this invention to provide a method and apparatus which affords in a flow of water a concentration of oxygen or other gas of similar physical properties which is substantially independent of not only water flow rate but also water temperature over useful ranges of these parameters.

SUMMARY OF THE INVENTION

In one aspect, the present invention consists in apparatus for providing a controlled concentration of a soluble gas in a flow of liquid, comprising a liquid flow path having first and second parallel connected sections, means for forming a saturated solution of the gas in the liquid flowing along the second section, and means for ensuring that the fraction of the total flow which passes along the second section is substantially independent of the magnitude of the total flow, the concentration of the gas in the liquid flow thereby being controlled at a location downstream in the flow path from the first and second sections thereof by virtue of the contribution to the flow in the first section of flow from the second section of the flow path.

Suitably, the liquid is water and the apparatus is adapted and arranged so that in operation the variation of the solubility of the gas in water with water temperature is at least partially compensated for by the variation with water temperature of the fraction of the total flow which passes along the second section.

In another aspect the present invention consists in the method of providing a controlled concentration of a gas in a flow of liquid, comprising the steps of dividing the flow between a first and a second flow in a ratio which is independent of the magnitude of the total flow; forming a saturated solution of the gas in the liquid of the second flow; and recombining the first and second flows to give a flow containing a controlled concentration of the gas.

BRIEF DESCRIPTION OF THE DRAWINGS

The invention will now be described by way of example with reference to the accompanying drawings in which:

FIG. 3 is a part section plan view of FIG. 2,

FIG. 4 is a cross section taken on AA of FIG. 3,

FIG. 5 is a part sectional end elevation of FIG. 1, and

FIG. 6 is a sectional view of part of FIG. 3.

DETAILED DESCRIPTION OF THE PREFERRED EMBODIMENTS

Figure 1:
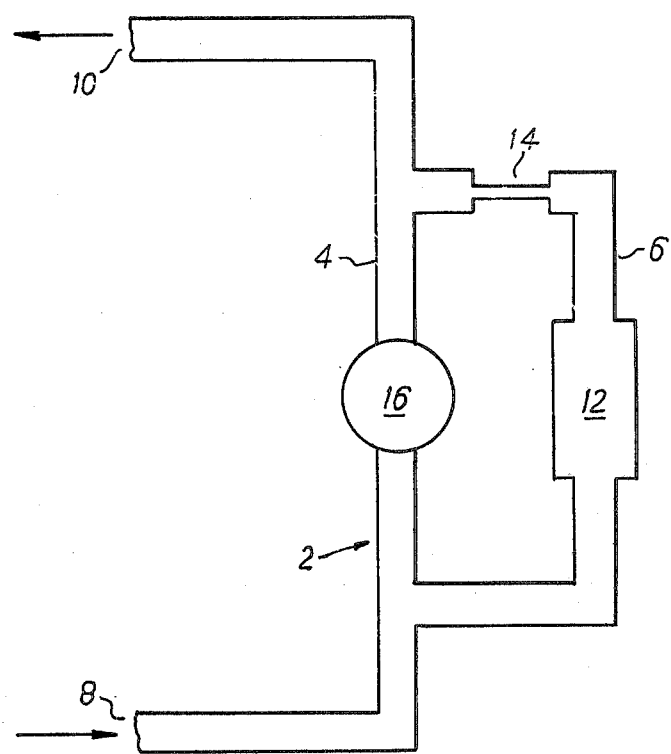
FIG. 1 is a block diagram of apparatus illustrating general principles of the invention.
Figure 2:
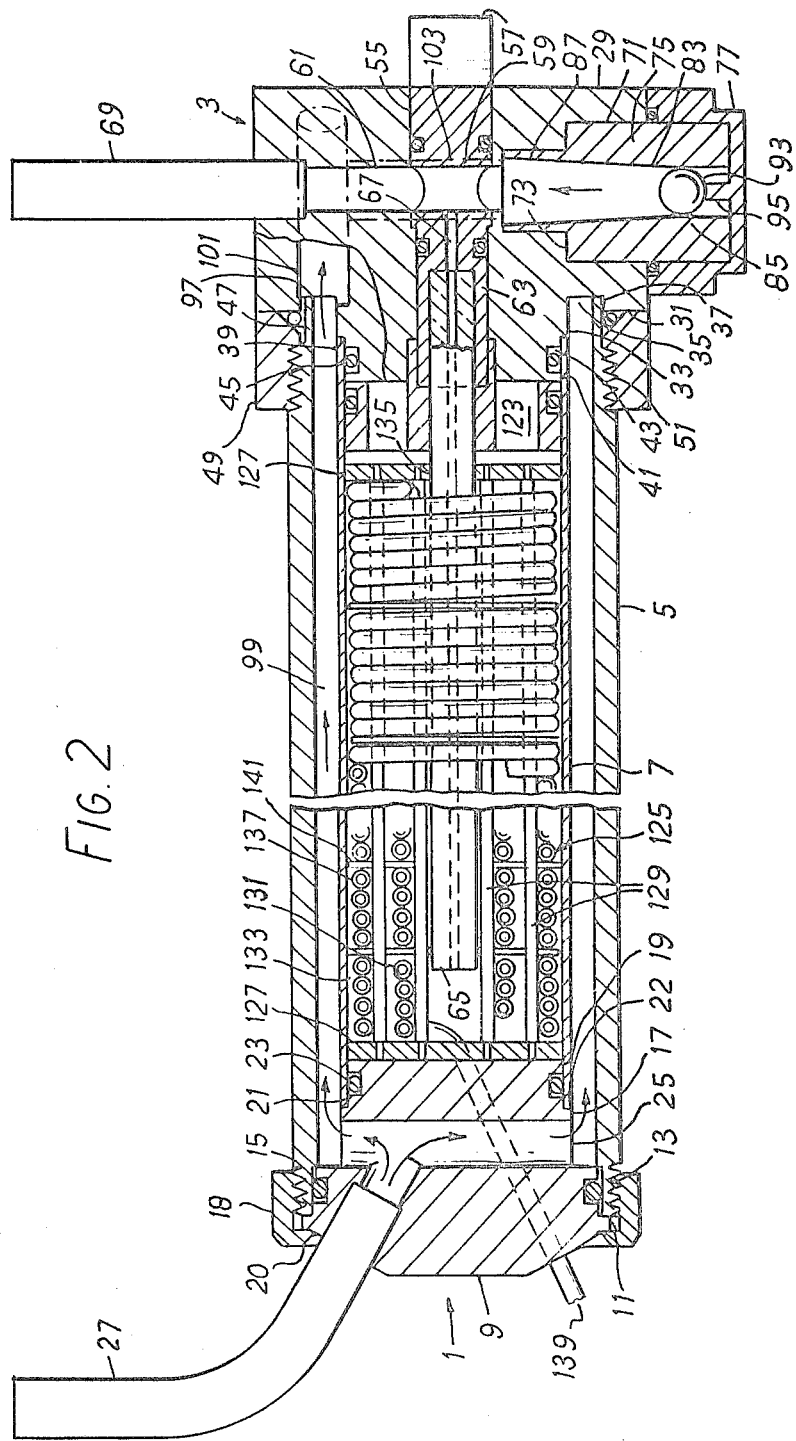
FIG. 2 is a section view of apparatus according to the invention.

With reference now to FIG. 1, a flow path 2 is shown having first and second sections, 4 and 6 respectively, connected to parallel between an inlet 8 and an outlet 10 for the liquid flow. The second section comprises a saturator 12 and a restriction 14 connected in series. A variable orifice 16 is disposed in the first section of the flow path.

The restriction might, for instance, comprise a precision bore capillary tube, serving to ensure that only a small fraction of the total flow passes along the second section and further, that the flow along the second section is very slow and laminar. The nature of the saturator will depend on what gas it is desired to place in solution. For example, the saturator might contain a membrane which is permeable to the gas but impermeable to the liquid. This membrane would be arranged to separate the liquid flowing along the second section from a supply of the gas. Bearing in mind the flow rate through the saturator as determined primarily by the restriction, the membrane must be of sufficient size and permeability to ensure that the liquid becomes saturated on passing through the saturator. It should be noted that although the invention requires the gas of interest to be soluble it need only be very slightly soluble and gases which are normally classed as insoluble since their very low solubility is for most purposes negligible might nevertheless be suitable here.

Liquid flowing from the inlet will divide between the two parallel connected sections of the flow path, the liquid which passes through the second section will receive a fixed concentration of the substance, and the flow through the first section will be dosed with flow from the second section before passing to the outlet. Now, provided that the ratio of the magnitudes of the flows through the first and second sections is arranged to be independent of the magnitude of the total flow, the concentration of the gas in the liquid flowing through the outlet will remain substantially constant notwithstanding variations in the magnitude of the total flow.

If the flows through the first and second sections have the same dependence on the common pressure drop across the sections, then the above proviso will be satisfied, since any increase in total flow will result in an increased pressure drop and the two parallel flows will increase together, their ratio being preserved. This may occur, for instance, where both flows are laminar. However, it is in certain cases, for reasons which will be described below, advantageous for one flow to be made turbulent and the other laminar. The variations of the flow through a simple pipe with the pressure drop along that pipe are somewhat different for the two cases of laminar and turbulent flow and it is accordingly necessary to introduce a regulator such as a variable orifice to ensure that the above condition is met.

The variable orifice is designed so that as flow increases the area of the orifice increases so that a generally linear relation between flow and pressure is maintained notwithstanding turbulence. This linear relationship is characteristic of a laminar flow and so if the variable orifice is placed in the section of the flow path containing the turbulent flow, both flows will depend on the common pressure drop in a similar fashion and the proviso will again be satisfied. Thus with reference to FIG. 1, the flow through the first section may be made turbulent yet the ratio of the two flows will not depend on the total flow.

The above discussion is obviously only strictly true when the temperature of the liquid remains constant since the solubility of the gas and hence the concentration of a saturated solution may well vary with temperature. All other things being equal, in the case of a gas whose solubility in the particular liquid falls with increasing temperature, the concentration in the liquid flow through the outlet will fall if the temperature of the liquid rises. In certain cases the rate of change of solubility with temperature is considerable and so this can be an important disadvantage of an apparatus striving to provide a controlled concentration.

Apparatus according to one embodiment of the invention overcomes this problem in a particularly advantageous fashion. Referring again to FIG. 1 the flow through the first section of the pipe can be made turbulent by, for instance, a suitable choice of the cross section of the flow path, whilst the flow through the second section is kept laminar suitably by ensuring that the flow through this section is very slow.

It is a fact that the dependences on liquid viscosity of turbulent and laminar flows are very different. The magnitude of a laminar flow is inversely proportional to the viscosity, whilst for turbulent flows the relationship is more complex and varies with the degree of turbulence. Accordingly if the temperature of the liquid, and consequently its viscosity, alters, there will be a disproportionate increase in the flow through one of the sections.

In one embodiment, the present invention uses this fact to provide an oxygen concentration in a flow of water which is not only independent to a large extent of the magnitude of the flow but also independent of the water temperature over a useful range. The solubility of oxygen in water decreases with increasing temperature, as does the viscosity of water; in fact the two parameters are similar functions of temperature over a range of about 10° to 40° C. In order to make use of this fact, the ratio between the first and second flows is made large — typically 600:1 — by the presence of the restrictor in the second section of the flow path. If, as a first approximation, the behavior of the turbulent flow is taken to be independent of temperature, that flow will establish a constant pressure drop across the two parallel sections. Then, an increase in water temperature will result in an increased flow through the second section, the increase being proportional to the decrease in viscosity. However, this increased flow will be brought to a lower level of oxygen concentration due to the decreased oxygen solubility. To the extent that the dependencies on temperature of water viscosity and oxygen solubility are equal, the one will compensate for the other and the oxygen concentration in the total flow through the outlet will remain constant.

Of course the dependencies of viscosity and oxygen solubility on water temperature are not identical and although the compensation effect is significant a residual temperature coefficient remains. This residual temperature coefficient amounts to about 0.45% per °C. However, the approximation that the common pressure drop across the two sections of the flow path remains constant inspite of temperature variations, is not strictly accurate since the magnitude of a turbulent flow is to a certain extent temperature dependent, although the temperature dependence is of course a good deal less marked than in the case of laminar flows. Moreover, the temperature dependence is governed by the degree of turbulence, being more important for a flow which is almost laminar than for one which is fully turbulent. Accordingly a degree of control is available and by a suitable choice of parameters such as liquid velocity and pipe diameter for the first section of the flow path it is possible to adjust the temperature coefficient of the common pressure drop to partially compensate for the residual temperature coefficient measured above. In fact the overall temperature coefficient can be reduced to 0.3% per °C. Now it will be clear that certain other gases will allow a similar temperature compensation effect to be arranged. The important factor is the function of solubility in water of the gas against water temperature, as compared with the function of water viscosity with temperature. Nitrogen, for example, is very similar to oxygen in this respect and this embodiment of the invention could usefully be applied to produce a controlled concentration of nitrogen in water which is substantially independent of water temperature. This embodiment of the invention is generally applicable to a gas whose solubility in water decreases with increasing temperature since the decrease in water viscosity will to a greater or lesser extent compensate for the decreased concentration of a saturated solution. However, the degree of compensation will vary and the invention will only provide important temperature compensating advantages for gases whose behaviour in this respect is close to that of oxygen. As an example apparatus according to the invention might be expected to reduce the temperature coefficient in the case of chlorine to about 0.7% per °C and in the case of carbon dioxide to about 10% per °C. If the turbulence of the flow through the first section is suitably altered in the manner suggested it may be possible to reduce these coefficients even further.

Apparatus for providing a controlled concentration of oxygen in a flow of water will now be described in more detail with reference to FIGS. 2 to 6. The apparatus is generally cylindrical in shape and comprises an inlet manifold 1, an outlet manifold 3, an outer cylindrical sleeve 5 and an inner cylindrical sleeve 7.

The inlet manifold 1 comprises a circular end plate 9 having a flange 11 and a circumferential groove 13. This end plate is positioned in the end of the outer sleeve 5 with the end of that sleeve abutting flange 11 and with an O-ring 15 located in groove 13 providing a seal between the inlet manifold and the outer sleeve. A collar 18 is screw threaded onto the end of the outer sleeve, a radially inwardly projecting lip 20 of the collar abutting flange 11 and securing the inlet manifold to the outer sleeve. Formed in one coaxially with the end plate 9 is a cylindrical spigot 17 which projects inwardly of the outer sleeve, and has, at its end remote from the end plate, a portion 19 of reduced diameter containing a circumferential groove 21 and being separated from the remainder of the spigot by a shoulder 22. This portion 19 projects inside the inner sleeve 7 the end of which abuts shoulder 22. O-ring 23 located in groove 21 ensures a waterproof seal between the inlet manifold 1 and the inner sleeve 7. Spigot 17 is traversed by a diametric passage 25 located between end plate 9 and shoulder 22. Passage 25 communicates internally of the inlet manifold with an inlet pipe 27 which projects through the end plate in a generally axial direction.

The outlet manifold 3 comprises a manifold block 29 having an end face 31 directed inwardly of the apparatus. A cylindrical spigot 33 is formed in one with manifold block 29 and projects inwardly of outer sleeve 5. Spigot 33 is surrounded by an annular recess 35 in face 31, this recess being bounded in the radially outward direction by step 37. As with the sigot 17 of the inlet manifold, spigot 33 has a shoulder 39, a portion of reduced diameter 41 and a circumferential groove 43 containing an O-ring 45. The adjacent end of inner sleeve 7 abuts shoulder 39 and is in sealing engagement with O-ring 45.

The corresponding end of the outer sleeve is formed with a stepped portion 47 of reduced thickness which projects into the annular recess 35 adjacent step 37 thereof. The outer sleeve 5 is secured to the outlet manifold 3 by means of a collar 49 which is screw threaded at 51 for engagement with a complementary thread on the outer sleeve and which is bolted to the manifold block 29 with bolts 53.

The manifold block is traversed by a bore 55 lying along the axis 56 of the apparatus, the bore containing a capillary support member 57. The capillary support member is provided with a transverse passage 59 which is arranged to be in alignment with a radial passage 61 passing through the manifold block and intersecting the bore 55 perpendicularly. The innermost end of the capillary support member 57 is formed with a socket 63 for receipt of one end of precision bore capillary tube 65. A narrow passage 67 communicates between the bore of the capillary tube 65 and the transverse passage 59 of the capillary support member 57.

In one end of the radial passage 61 through the manifold block, an outlet pipe 69 is secured. The other end of the radial passage 61 leads into the regulator chamber 71. This chamber is substantially cylindrical with a circular step 73 near the top of the chamber and contains the regulator block 75 which is held in place by a regulator cover 77 bolted to the underside of the manifold block 29. The regulator block 75 is externally shaped to be a complementary fit inside the chamber 71 but has a minor segment extending from the regulator cover 77 to the circular step 73 cut away so that cavity 79 is formed between the regulator block 75 and a portion 81 of the wall of the chamber 71. A tapered axial bore 83 traverses the regulator block 75, being closed at the lower, narrow end 85 by the regulator cover 77 and communicating at the upper, wider end 87 with the radial passage 61 through the manifold block 29. An opening 89 is made at the base of the regulator block 75 through the side 91 of that block adjacent the cavity 79 to provide a connection between the tapered bore 83 and that cavity. A precision ground glass ball 93 is located in the tapered bore 83 and is prevented from escaping through the opening 89 by an upstanding pillar 95 formed integrally with the regulator cover 77. The regulator formed by glass ball 93 and tapered bore 83 acts as a variable orifice. As the flow increases the ball will rise up the bore until it reaches a position where the upward drag force equals the downward gravitational force. The larger the flow, the greater the height attained by the ball and consequently the larger the area of the orifice formed by the annular gap between the ball and the tapered bore. An increase in the size of the orifice will tend to reduce the pressure across the regulator and so the variation of pressure with flow will tend to be linear rather than quadratic as is approximately the case for fixed orifices, when, as here, the flow is turbulent.

The end face 31 of the manifold block 29 is formed with an aperture 97 positioned in the annular recess 35 so as to communicate with the annular gap 99 between the inner and outer sleeves. A channel 101 is cut through the manifold block 29 lying in a horizontal plane but being inclined to the axis 56 of the apparatus; this channel 101 communicating between the aperture 97 and a vertical passage 103, in the manifold block 29. The vertical passage 103 is generally parallel to the radial passage 61 and extends down from the channel 101 through a valve chamber 105 before opening out into the cavity 79 of the regulator chamber 71.

A narrow valve passage 107 leads from the innermost end of the valve chamber 105 to an aperture 109 in the end face 111 of spigot 33 where it communicates with the interior of the inner sleeve 7. A valve member 113 cooperates with a valve seat 115, together forming a valve 117 to seal off the valve passage 107 from the valve chamber 105. The valve member 113 may be withdrawn to open the valve passage 107 by rotating a knurled handle 119 which is rigidly secured to the valve member 113 and screw threaded to a valve plate 121 bolted to the manifold block 29.

The main flow path through the apparatus thus comprises the inlet pipe 27; the diametric passage 25 of the inlet manifold 1; the annular passage 99 formed by and between the inner and outer sleeves; the aperture 97 in the annular recess 35 of the outlet manifold 13; channel 101; vertical passage 103 incorporating valve chamber 105; the cavity 79 in the regulator chamber 71; the opening 89 through the side-wall 91 of the regulator block 75; the tapered bore 83 of the regulator block; the radial passage 61 through the outlet manifold, incorporating the aligned transverse passage 59 through the capillary support member 57; and, finally, the outlet pipe 69. Connected in parallel with the tapered bore 83 of the regulator block 75 when the valve 117 is open is a seconary flow path. This comprises valve passage 107, the interior of inner sleeve 7 and the bore of capillary tube 65 which extends almost the whole length of the inner sleeve. It will be seen that the cavity 79 in the regulator chamber 71 and the tapered bore 83 of the regulator block 75 on the one hand, and the secondary flow path mentioned above on the other, form respectively first and second parallel connected sections of the total flow path. The coaxial arrangement of, on the one hand the flow through annular passage 99 and on the other the flow through the second section of the flow path is particularly advantageous since it leads to a single water temperature prevailing throughout the apparatus.

The interior of the inner sleeve serves as the saturator. At its end adjacent the outlet manifold it contains an annular filter 123 which is in sealing engagement with both the capillary tube 65 and the inner surface of inner sleeve. This filter acts to prevent foreign particles from entering the saturator. The remainder of the length of the inner sleeve is occupied by a generally cylindrical aeration assembly 125 comprising two end discs 127 which support between them a plurality of parallel rods 129 arranged in a formation consisting of inner and outer coaxial cylinders, 131 and 133 respectively. The end discs 127 each have a central hole 135 which is a tight fit around the capillary tube 65. A long piece of oxygen permeable tubing 137 is wound around the parallel rods 129 starting adjacent the inlet manifold, proceeding along the outer cylinder 133 of rods 129 in helical fashion, being reversed at the end disc adjacent the outlet manifold and returning along the inner cylinder 131 of rods, again in helical fashion. The tubing is firmly wound, with adjacent turns of the respective helices being in contact with each other. The two ends 139 of the tubing are taken out through the inlet manifold 1 to the atmosphere. Baffle plates 141 are arranged on the aeration assembly 125 to divert the flow through the inner sleeve into a helical path, so increasing the length of time the flow spends in contact with the aeration assembly. A suitable material for the tubing would be silicone rubber.

In operation of the apparatus it would typically be connected in the supply line to a low level dissolved oxygen meter. Under normal circumstances valve 117 would be closed and the flow of water through the apparatus would be along the main flow path detailed earlier. When it is desired to obtain a calibration of the meter this valve would be opened whereupon the secondary flow path would be available to the liquid.

When water following along the secondary flow path reaches the aeration assembly 125 oxygen will diffuse through the walls of the tubing until the partial pressure of oxygen in the water equals the partial pressure of atmospheric oxygen; the solution is then saturated at that pressure. The two concentric helices of tubing are necessary to minimize the radial thickness of any layer of water in the aeration assembly since the diffusion rate of oxygen through water is low. As water passes along the aeration assembly the concentration of dissolved oxygen will rise until at a point, preferably some two thirds of the way along, the solution becomes saturated. The flow then continues until it reaches the end of the aeration assembly from where it is able to return to the outlet manifold via the capillary tube 65, rejoining the main flow at the point where the narrow passage 67 of the capillary support member 57 connects with the transverse passage 59 of that member.

Only a small fraction of the total flow passes through the aeration assembly, in fact the ratio of the magnitudes of the flows through the first and second parallel connected sections is around 600:1. In addition the fine bore of the capillary tube ensures that flow through the second section is very slow and in consequence this flow is laminar. By contrast the flow through the first section is fast and turbulent and by suitable choice of such parameters as the width of the tapered bore 83 through the regulator block 75, the angle of the taper and the weight of the glass ball 93, the degree of turbulence can within limits be adjusted. With the apparatus shown in FIGS. 2 - 6 of the drawing the optimum value of these parameters has been found empirically.

As has been described with reference to FIG. 1, the concentration of oxygen in the flow out of the apparatus will be insensitive to changes in the magnitude of that flow and, indeed, for the particular apparatus described the stability of oxygen concentration has been found to be better than ± 2% over a rnge of flow from 260 – 330 millilitres per minute. As has been mentioned earlier the temperature coefficient of the oxygen concentration can be less than ± 0.3% per °C for the temperature range 10° – 40° C.

A calibration of the low level dissolved oxygen meter is achieved by measuring the oxygen concentration of the water from the apparatus once the valve has been open for a sufficient length of time for equilibrium to be reached. The difference between this measurement and a measurement of the water supply with the apparatus valve closed can be equated to the oxygen concentration which the apparatus is known to impart to the water flow. In the apparatus described this concentration is 14.1 $\mu g/L$ ± 0.25$\mu g/L$ though in general this concentration would be calculated once and for all by considering the ratio of the flows through the first and second sections and the concentration of a saturated solution, at a particular temperature. This type of "add-on" calibration requires that the background level of oxygen in the water be steady and not large compared with the concentration which is added-on by the apparatus. An alternative is to supply the apparatus with de-aerated water in which case an absolute calibration is provided. In certain circumstances, particularly where the apparatus is used continuously for long periods of time, it may be desirable to provide a flow of air through the tubing of the aeration assembly rather than simply leaving both ends of the tubing open to the atmosphere. The reason for this is that due to the differing diffusion rates of oxygen and nitrogen, an excess of nitrogen can build up. A convenient method of providing such a flow is to utilize a waste flow of water from a constant head arrangement of the system with a simple ejector pump connected to one end of the tubing.

The invention is not to be regarded as limited to applications involving calibration procedures.

One example of a further use of apparatus and methods according to the invention is the situation where it is required to dose a water main with a precisely controlled concentration of, say, a sterilizing agent; other applications will doubtless suggest themselves to the skilled reader.

Although the specific embodiment of the invention described in detail above relates to the provision of a controlled concentration of oxygen in a flow of water it should be remembered that, as mentioned before, the invention is in its broadest sense applicable to the provision of controlled concentrations of soluble gases in flows of liquids.

What I claim is:

1. Apparatus for providing a controlled concentration of a soluble gas in a flow of liquid, comprising a liquid flow path having first and second parallel connected sections, means for forming a saturated solution of the gas in the liquid flowing along the second section, and means for ensuring that the fraction of the total flow which passes along the second section is substantially independent of the magnitude of the total flow, the concentration of the gas in the liquid flow whereby being controlled at a location downstream in the flow path from the first and second sections thereof by virtue of the contribution to the flow in the first section of flow from the second section of the flow path.

2. Apparatus as claimed in claim 1, wherein the means for forming a saturated solution of the gas in the liquid flowing along the second section comprises a membrane surface which is permeable to the gas and which is supported in such a manner as to separate a supply of the gas from the liquid flowing along the second section, the membrane surface being of sufficient extent to ensure that in operation a saturated solution of the gas is formed in the liquid flowing along the second section.

3. Apparatus as claimed in claim 2, wherein the membrane surface comprises a length of tubing which is connected at one or both of its ends to the supply of the gas and a portion of which intermediate the ends of the tubing is disposed in the second section of the flow path.

4. Apparatus as claimed in claim 3, wherein said portion of the length of tubing is arranged in helical fashion to provide an essentially cylindrical membrane surface.

5. Apparatus as claimed in claim 4 wherein said portion of the length of tubing is wound to form inner and outer coaxial helices.

6. Apparatus as claimed in claim 1, wherein the flow of liquid is a flow of water.

7. Apparatus as claimed in claim 1, adapted to afford flow through the second section of the flow path which is a laminar flow and flow through the first section which is a turbulent flow.

8. Apparatus as claimed in claim 7 wherein the flow of liquid is a flow of water, adapted and arranged so that in operation the variation of the solubility of the gas in water with water temperature is at least partially compensated for by the variation with water temperature of the fraction of the total flow which passes along the second section.

9. Apparatus as claimed in claim 8 wherein the means for forming a saturated solution of the gas in the liquid flowing along the second section comprises means for dissolving oxygen in that liquid.

10. The method of calibrating a dissolved oxygen monitor comprising the steps of measuring the oxygen concentration of a supply of water with the monitor, measuring with the monitor the oxygen concentration of water from the supply which has been passed through apparatus according to claim 9, and equating the difference between the valves values of the two measurements to the known value of the controlled concentration of oxygen provided by the apparatus.

11. Apparatus as claimed in claim 1 in which the flow through the first section is arranged to be a turbulent flow whilst the flow through the second section is arranged to be a laminar flow, wherein the means for ensuring that the fraction of the total which passes along the second section is substantially independent of the magnitude of the total flow comprises a variable orifice disposed in the first section of the flow path, the variable orifice being adapted so that the area of the orifice transverse to the flow therethrough increases as the magnitude of the flow along the first section increases, it thereby being arranged that the pressure drop across the first section of the flow path and the magnitude of the flow through that section remain substantially proportional to one another notwithstanding that the flow through the first section is turbulent.

12. Apparatus as claimed in claim 11, wherein the variable orifice comprises a spherical ball constrained for movement along a tapered passage which forms part of the first section of the flow path, the ball being biassed toward a narrower region of the passage and being adapted to move toward a wider region of the passage upon an increase in the magnitude of the flow through the first section of the flow path.

13. Apparatus as claimed in any one of the preceding claims claim 1, comprising inner and outer coaxial cylindrical sleeves extending between inlet and outlet manifolds and a precison bore capillary tube extending from the outlet manifold toward the inlet manifold along the axis of the sleeves, wherein an annular passage between the inner and outer sleeves forms a part of the liquid flow path upstream in the flow path from the first and second sections thereof, the second section of the flow path comprising the interior of the inner sleeve and the bore of the capillary tube, the first section of the flow path comprising a passage in the outlet manifold communicating between the interior of the inner sleeve and an end of the capillary tube adjacent the outlet manifold.

14. The method of providing a controlled concentration of a gas in a flow of liquid, comprising the steps of dividing the flow between a first and a second flow in a ratio which is independent of the magnitude of the total flow; forming a saturated solution of the gas in the liquid of the second flow; and recombining the first and second flows to give a flow containing a controlled concentration of the gas.

15. The method according to claim 14, further comprising the steps of causing the first flow to be a turbulent flow whilst causing the second flow to be a laminar flow.

16. The method according to claim 15, and in which the flow of liquid is a flow of water, wherein the step of forming a saturated solution of the gas in the water of the second flow comprises the formation of a saturated solution of oxygen in that water and wherein the variation of the solubitity of oxygen in water with water temperature is sensibly compensated for by the variation with water temperature of the ratio of the respective magnitudes of the first and second flows.

* * * * *